(12) United States Patent  
Eguchi et al.

(10) Patent No.: US 8,991,582 B2  
(45) Date of Patent: Mar. 31, 2015

(54) CLUTCH ACTUATOR

(71) Applicant: EXEDY Corporation, Neyagawa-shi, Osaka (JP)

(72) Inventors: Yasuhiko Eguchi, Neyagawa (JP); Teruhiko Tanaka, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/360,909

(22) PCT Filed: Nov. 16, 2012

(86) PCT No.: PCT/JP2012/079761  
§ 371 (c)(1),  
(2) Date: May 27, 2014

(87) PCT Pub. No.: WO2013/088901  
PCT Pub. Date: Jun. 20, 2013

(65) Prior Publication Data  
US 2014/0353109 A1  Dec. 4, 2014

(30) Foreign Application Priority Data

Dec. 15, 2011 (JP) ................................ 2011-274752

(51) Int. Cl.
```
F16H 25/20    (2006.01)
F16H 25/12    (2006.01)
F16D 28/00    (2006.01)
F16D 23/12    (2006.01)
```
(Continued)

(52) U.S. Cl.  
CPC ................ F16H 25/12 (2013.01); F16D 28/00 (2013.01); F16H 25/20 (2013.01); F16H 25/2204 (2013.01); F16H 2025/2075 (2013.01); F16H 2025/2053 (2013.01); F16D 23/12 (2013.01); F16D 2023/123 (2013.01); F16D 27/14 (2013.01)  
USPC ........................... 192/84.6; 192/94; 74/89.39

(58) Field of Classification Search  
USPC ................ 192/223, 84.6, 94; 74/89.39, 89.38  
See application file for complete search history.

(56) References Cited

U.S. PATENT DOCUMENTS 4,753,572 A   6/1988  Kusiak  
8,262,531 B2 * 9/2012  Himmelmann et al. ...... 475/263

(Continued)

FOREIGN PATENT DOCUMENTS

EP   1515415 A2 *  3/2005  ............... H02K 7/06  
JP   2779803 B    7/1998

(Continued)

*Primary Examiner* — Ramya Burgess  
*Assistant Examiner* — Lillian Nguyen  
(74) *Attorney, Agent, or Firm* — Global IP Counselors, LLP

(57) ABSTRACT

An actuator for driving a release mechanism of a clutch includes a motor, an output member, a ball screw mechanism, a trapezoidal screw mechanism and a power transmission mechanism. The output member is coupled to the release mechanism, and is movable in an actuation direction of the release mechanism. The ball screw mechanism is configured to convert rotation of the motor in one direction into movement of the output member in a first axial direction. The trapezoidal screw mechanism has a self-lock function against a reverse driving force from the release mechanism, and is configured to convert rotation of the motor in the other direction into movement of the output member in a second axial direction. The power transmission mechanism is configured to selectively transmit rotation of the motor to the ball screw mechanism or the trapezoidal screw mechanism.

5 Claims, 6 Drawing Sheets

(51) Int. Cl.
    *F16D 27/14*     (2006.01)
    *F16H 25/22*     (2006.01)

(56) References Cited

U.S. PATENT DOCUMENTS

2003/0006120 A1* 1/2003 Yoshida et al. ............ 192/223.2
2004/0261554 A1* 12/2004 Tylosky ....................... 74/89.39
2009/0090204 A1* 4/2009 Jones et al. .................. 74/89.39
2012/0018262 A1* 1/2012 Winkler ..................... 188/106 F

FOREIGN PATENT DOCUMENTS

| JP | 2003-194101 A | 7/2003 |
| JP | 2005-083474 A | 3/2005 |

* cited by examiner

CLUTCH ACTUATOR

CROSS-REFERENCE TO RELATED APPLICATIONS

This application is a U.S. National Stage application of International Application No. PCT/2012/079761, filed Nov. 16, 2012, which claims priority to Japanese Patent Application No. 2011-274752, filed in Japan on Dec. 15, 2011, the entire disclosure of which is hereby incorporated by reference.

BACKGROUND

1. Field of Invention

The present invention relates to an actuator, and particularly to an actuator for driving a release mechanism of a clutch.

2. Background Information

A device using an electric motor has been developed as a device for setting a clutch device of a vehicle to either a power transmitted (clutch-on) state or a power blocked (clutch-off) state. For example, a device described in Japanese Laid-open Patent Application No. JP-A-2003-194101 includes a motor, a motion conversion mechanism configured to convert a rotary motion of a motor into a linear motion, and a mechanism configured to drive a release mechanism of a clutch by means of the linear motion produced as a result of conversion by the motion conversion mechanism.

In general, the clutch device is configured to produce the clutch-on state by causing a diaphragm spring to press a clutch disc, while being configured to produce the clutch-off state by causing the release mechanism to release the pressing force of the diaphragm spring. Therefore, when the clutch-off state is produced by actuating the release mechanism in the device as described above, chances are that driving force is reversely applied from the release mechanism side due to the pressing force of the diaphragm spring. Where a motor is configured to be rotatable in response to such reverse driving from the release mechanism side, a member on the release mechanism side cannot be locked.

In view of the above, for the purpose of locking the release-mechanism side member, there are provided a method of constantly supplying electric power to the motor and a method of actuating a self-lock function in a path of transmitting power from the motor to the release mechanism. In Japanese Laid-open Patent Application No. JP-A-2003-194101, for instance, the motion conversion mechanism is composed of a worm gear and a worm wheel, and the self-locking function is configured to be actuated against reverse driving from the release mechanism side.

SUMMARY

In the actuator described in the above mentioned Japanese Publication, the driving force from the motor is transmitted toward the release mechanism through the worm gear and the worm wheel. However, as is well known, transmission efficiency between the worm gear and the worm wheel is roughly 40% to 50% and is thus quite low. Therefore, it is required to provide a high output motor to obtain desired release force.

It is an object of the present, invention to enhance efficiency of a clutch actuator for actuating a release mechanism, especially, in driving the release mechanism.

A clutch actuator according to a first exemplary embodiment of the present invention drives a release mechanism of a clutch, and includes an electric motor, an output member, a first drive mechanism and a second drive mechanism. The output member is coupled to the release mechanism and is movable in an actuation direction of the release mechanism. The first drive mechanism is configured to convert rotation of the electric motor in one direction into movement of the output member in a first axial direction. The second drive mechanism has a self-lock function against a reverse driving force from the release mechanism, and is configured to convert rotation of the electric motor in the other direction into movement of the output member in a second axial direction.

According to the actuator of the first exemplary embodiment, the rotation of the electric motor in the one direction is converted into movement of the output member in the first axial direction by the first drive mechanism. The release mechanism is driven by movement of the output member in the first axial direction. By contrast, when the reverse driving force is applied to the output member from the release mechanism, the reverse driving force is transmitted to the second drive mechanism. The second drive mechanism has the self-lock function against the reverse driving force from the release mechanism. Therefore, the movement of the output member in the second axial direction is prevented, and as a result, the release-mechanism side member is locked. Further, the rotation of the electric motor in the other direction is converted into movement of the output member in the second axial direction by the second drive mechanism.

Here, the release mechanism is driven through the first drive mechanism when being driven in the one direction, whereas the release mechanism is driven through the second drive mechanism having the self-lock function when being driven in the other direction. Therefore, the first drive mechanism can be structured by a mechanism with good transmission efficiency.

A clutch actuator according to a second exemplary embodiment of the present invention relates to the actuator of the first exemplary embodiment of the present invention, and wherein the first drive mechanism is a ball screw mechanism configured to press the output member in the first axial direction by rotation of the electric motor in the one direction.

The ball screw mechanism is capable of transmitting power with high efficiency. Therefore, it is possible to achieve reduction in size of the electric motor for driving the release mechanism.

A clutch actuator according to a third exemplary embodiment of the present invention relates to the actuator of the first or second exemplary embodiments of the present invention, wherein the second drive mechanism is a trapezoidal screw mechanism to which the reverse driving force from the output member is transmitted and that is configured to move the output member in the second axial direction by rotation of the electric motor in the other direction.

Here, the trapezoidal screw mechanism is used as the second drive mechanism, and therefore, the self-lock function can be implemented with a simple structure.

A clutch actuator according to a fourth exemplary embodiment of the present invention relates to the actuator of any of the first to third exemplary embodiments of the present invention, and wherein the ball screw mechanism includes a first screw shaft, a first nut and a plurality of balls. The first screw shaft has a screw thread on an outer peripheral surface thereof, and is coupled to an output shaft of the electric motor. The first nut has a screw thread on an inner peripheral surface thereof, and is configured to be contacted to the output member to move the output member in the first axial direction when the electric motor is rotated in the one direction, while being configured to be separated away from the output member when the electric motor is rotated in the other direction.

The plural balls are disposed on the screw thread of the first screw shaft and the screw thread of the first nut.

Here, when the electric motor is rotated in the one direction, power is transmitted from the first screw shaft to the first nut through the plural balls, and is further transmitted to the output member. Accordingly, the output member is moved in the first axial direction. By contrast, when the electric motor is rotated in the other direction, the first nut is separated away from the output member. Therefore, when the reverse driving force is applied to the output member from the release mechanism, the reverse driving force is not transmitted to the ball screw mechanism.

A clutch actuator according to a fifth exemplary embodiment of the present invention relates to the actuator of the fourth exemplary embodiment of the present invention, and wherein the trapezoidal screw mechanism includes a second screw shaft and a second nut. The second screw shaft is configured to be rotated by means of the rotation of the electric motor in the other direction. The second nut is screwed onto the second screw shaft, and is configured to be self-locked with the second screw shaft when receiving the reverse driving force from the output member, while being configured to be moved together with the output member in the second axial direction when receiving a driving force from the second screw shaft.

Here, when the reverse driving force is applied from the release mechanism side, self-lock is actuated between the second nut and the second screw shaft, and the release-mechanism side member is locked. By contrast, when the rotation of the electric motor in the other direction is transmitted to the second screw shaft, the second nut is moved in the second axial direction by rotation of the second screw shaft.

A clutch actuator according to a sixth exemplary embodiment of the present invention relates to the actuator of the fifth exemplary embodiment of the present invention, and wherein the first screw shaft and the second screw shaft are disposed in parallel to each other. Further, the first nut has a protruding portion protruding toward the second screw shaft. The second nut is disposed in the protruding portion of the first nut to be axially slidable.

With the structure as described above, the rotation of the first nut of the ball screw mechanism can be prevented without using any special member or mechanism.

A clutch actuator according to a seventh exemplary embodiment of the present invention drives a release mechanism of a clutch, and includes an electric motor, an output member, a drive mechanism and a second nut. The output member is coupled to the release mechanism, and is movable in an actuation direction of the release mechanism. The drive mechanism includes a screw shaft that is configured to be rotated by the electric motor, and a first nut that is screwed onto the screw shaft and is coupled to the output member. The second nut is screwed onto the screw shaft and is allowed to be engaged with the output member, and has a self-lock function against a reverse driving force from the output member.

In the actuator, the rotation of the electric motor is converted into movement of the output member by the drive mechanism. The release mechanism is driven by movement of the output member. By contrast, when the reverse driving force is applied to the output member from the release mechanism, the reverse driving force is transmitted to the second nut. The second nut has the self-lock function with respect to the screw shaft of the drive mechanism. Therefore, the movement of the second nut is prevented against the reverse driving force from the output member. As a result, the release-mechanism side member is locked.

Here, the release mechanism is driven through the drive mechanism when being driven, whereas self-lock is actuated between the second nut and the screw shaft when the reverse driving force is applied from the release mechanism. Therefore, the drive mechanism can be formed by a mechanism with good transmission efficiency such, as a ball screw mechanism.

According to the exemplary embodiments of the present invention described above, it is possible to enhance efficiency of a clutch actuator for actuating a release mechanism in driving the release mechanism.

DETAILED DESCRIPTION OF EXEMPLARY EMBODIMENTS

First Exemplary Embodiment

Figure 1:
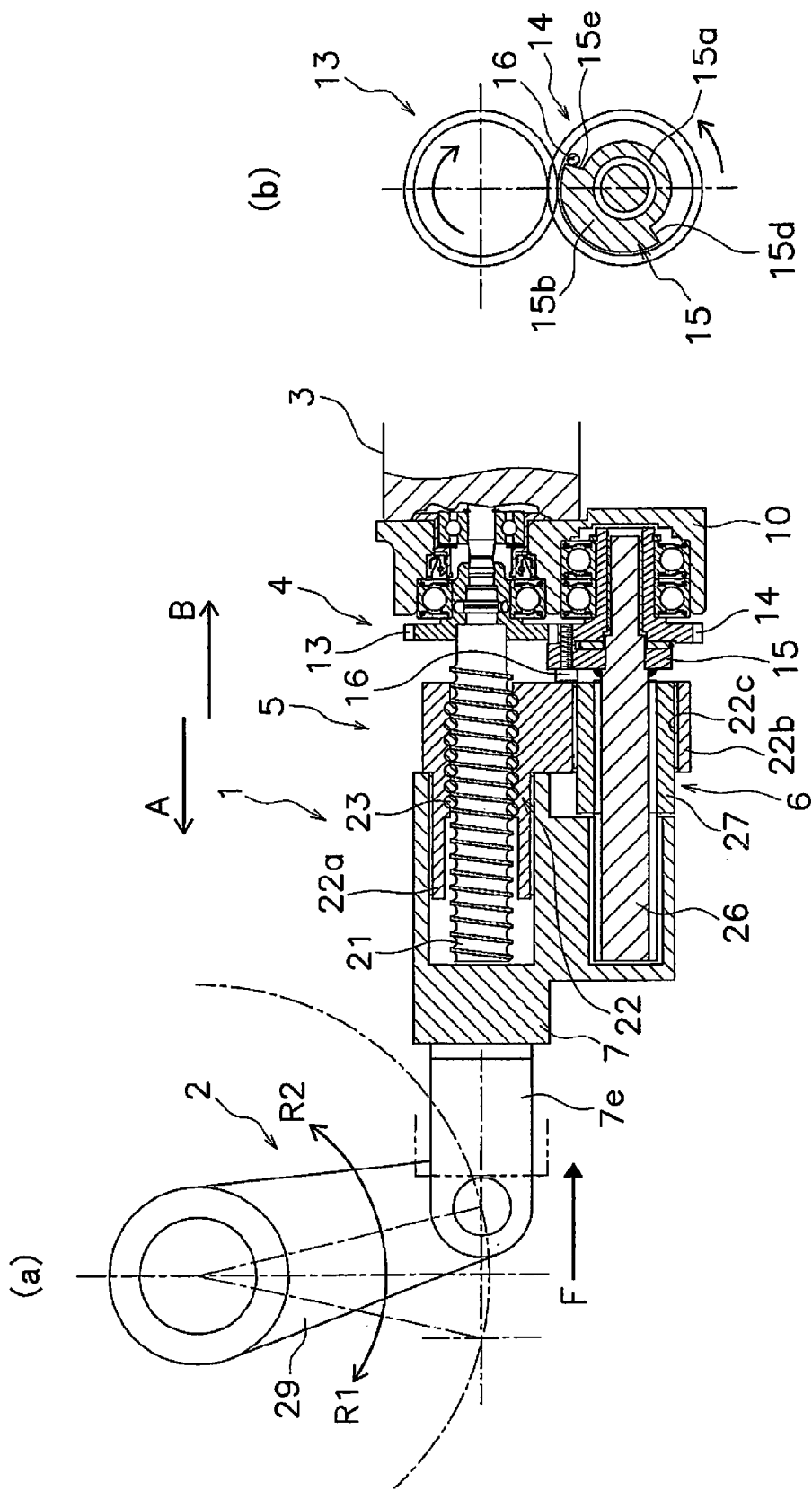
FIG. 1(a) is a cross-sectional structural view of a clutch actuator in accordance with a first exemplary embodiment of the present invention.
FIG. 1(b) is a front view of a power transmission mechanism in accordance with a first exemplary embodiment of the present invention.

FIGS. 1(a) and 1(b) illustrate a clutch actuator 1 and a release mechanism 2 according to a first exemplary embodiment of the present invention. FIG. 1(a) illustrates a cross-sectional structure of the actuator 1, whereas FIG. 1(b) illustrates a front view of a power transmission part.

Although not illustrated in the drawings, a clutch-side mechanism employs a general clutch device structure. In short, the clutch device includes a clutch cover assembly and a clutch disc assembly. Further, while a release action is not being performed, a clutch disc is pressed onto a friction surface of a flywheel by a diaphragm spring, and thus, a clutch-on state is produced. When the release mechanism 2 is then actuated by the actuator 1 illustrated in FIG. 1(a), a pressure plate of the clutch cover assembly is moved in a direction away from the flywheel against the pressing force of the diaphragm spring, and thus, a clutch-off state is produced.

Entire Structure

The actuator 1 includes an electric motor (hereinafter simply referred to as "a motor") 3, a power transmission mechanism 4, a ball screw mechanism 5 as a first drive mechanism and a trapezoidal screw mechanism 6 as a second drive mechanism, and an output member 7.

Figure 2:
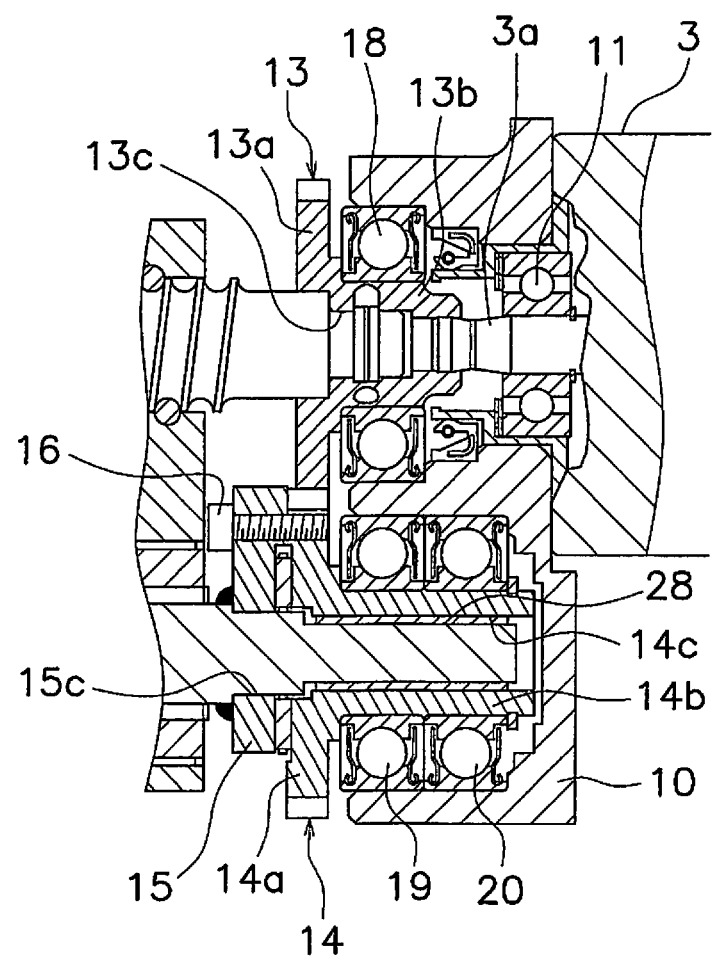
FIG. 2 is a partial enlarged view of a motor fixed to a support block of FIG. 1.

The motor 3 is fixed to a support block 10. As illustrated in FIG. 2, a rotation shaft 3a of the motor 3 is rotatably supported by the support block 10 through a bearing 11.

Power Transmission Mechanism

As illustrated in FIGS. 1 and 2, the power transmission mechanism 4 includes a first gear 13, a second gear 14, a phase switch plate 15 and a phase switch pin 16.

The first gear 13 has a gear portion 13a formed in a disc shape, and a boss portion 13b protruding from the gear portion 13a toward the motor 3. The boss portion 13b is rotatably supported by the support block 10 through a bearing 18. Further, the first gear 13 has a hole 13c axially penetrating through the center part thereof. The output shaft 3a of the motor 3 is inserted into one end part of the hole 13c. Thus, the output shaft 3a is coupled to the first gear 13, while being non-rotatable relative thereto.

The second gear 14 has a gear portion 14a formed in a disc shape, and a boss portion 14b protruding from the gear portion 14a toward the motor 3. The boss portion 14b is rotatably supported by the support block 10 through two bearings 19 and 20. Further, the second gear 14 has a hole 14c axially penetrating through the center part thereof.

As illustrated in FIG. 1(b), the phase switch plate 15 is disposed concentrically to the second gear 14. The phase switch plate 15 has a disc portion 15a formed on the inner peripheral side and a semi-circular portion 15b formed on the outer periphery of the disc portion 15a. A through hole 15c (see FIG. 2) is bored in the center part of the disc portion 15a, while axially penetrating therethrough. Further, a first end surface 15d and a second end surface 15e are formed on the both circumferential ends of the semi-circular portion 15b to make contact with the phase switch pin 16.

The phase switch pin 16 is fixed to the output-member-side lateral surface of the second gear 14, while protruding toward the phase switch plate 15. As described above, the phase switch pin 16 is contactable to the circumferential end surfaces 15d and 15e of the semi-circular portion 15b of the phase switch plate 15.

Ball Screw Mechanism

The ball screw mechanism 5 includes a ball screw shaft (first screw shaft) 21, a ball screw nut (first nut) 22 and a plurality of balls 23.

The ball screw shaft 21 has a helical screw thread on the outer peripheral surface thereof. Further, one end of the ball screw shaft 21 is inserted into the through hole 13c of the first gear 13. Thus, the ball screw shaft 21 is coupled to the first gear 13, while being non-rotatable relative thereto. In other words, the ball screw shaft 21 is coupled to the motor 3 through the first gear 13, and the ball screw shaft 21 and the first gear 13 are configured to be rotated in synchronization with rotation of the motor 3.

As illustrated in FIG. 1(a), the ball screw nut 22 has a screw portion 22a that the ball screw shaft 21 is inserted through the inside thereof, and a protruding portion 22b disposed to protrude from the screw portion 22a to the side, i.e., toward the trapezoidal screw mechanism 6. A helical screw thread is formed on the inner peripheral surface of the screw portion 22a. A through hole 22c is bored in the protruding portion 22b, while axially penetrating therethrough.

The plurality of balls 23 are rollably disposed on the screw thread formed on the ball screw shaft 21 and formed on the ball screw nut 22.

Trapezoidal Screw Mechanism

The trapezoidal screw mechanism 6 includes a trapezoidal screw shaft (second screw shaft) 26 and a trapezoidal screw nut (second nut) 27.

The trapezoidal screw shaft 26 has a screw thread with a trapezoidal cross-section on the outer peripheral surface thereof. The trapezoidal screw shaft 26 is rotatably supported by the second gear 14 through a bushing 28, while one end of the trapezoidal screw shaft 26 is inserted into the through hole 14c of the second gear 14. Further, the one end side part of the trapezoidal screw shaft 26 is inserted through the through hole 15c of the phase switch plate 15. Thus, the trapezoidal screw shaft 26 is fixed to the phase switch plate 15, while being non-rotatable relative thereto. In other words, the trapezoidal screw shaft 26 is rotatable relative to the second gear 14, while being rotated in synchronization with the phase switch plate 15.

The trapezoidal screw nut 27 is screwed onto the trapezoidal screw shaft 26. This trapezoidal screw nut 27 is inserted into the through hole 22c bored in the protruding portion 22b of the ball screw nut 22, while being rotatable and axially movable.

In the trapezoidal screw mechanism 6 as described above, when power is applied from the trapezoidal-screw-nut-27 side, the trapezoidal screw nut 27 is self-locked without being rotated with respect to the trapezoidal screw shaft 26. By contrast, when power is transmitted from the trapezoidal screw shaft 26 to the trapezoidal screw nut 27, the trapezoidal screw nut 27 is axially moved while being rotated with respect to the trapezoidal screw shaft 26.

Output Member

Figure 3:
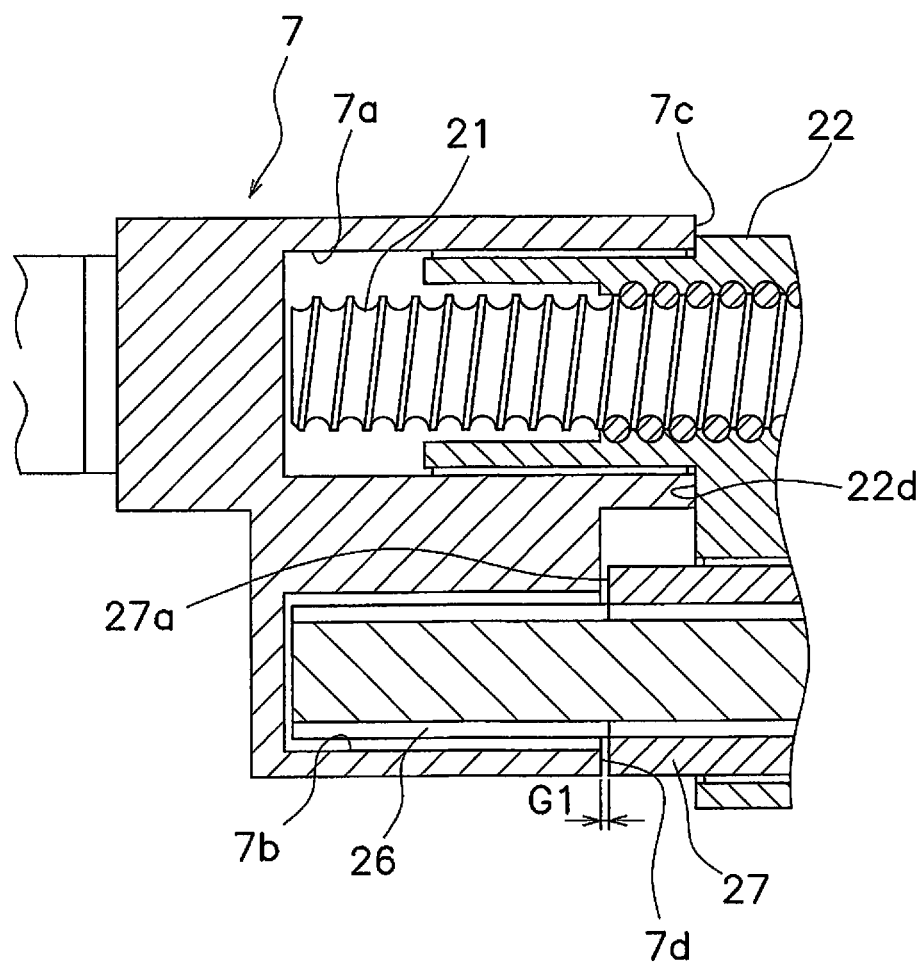
FIG. 3 is a partial enlarged view of an output member of FIG. 1.

The output member 7 is a block-shaped member. As illustrated in FIG. 3, the output member 7 has a first recessed portion 7a and a second recessed portion 7b. A first end surface 7c on the motor-3 side, i.e., an end surface of the part in which the first recessed portion 7a is formed, and a second end surface 7d on the motor-3 side, i.e., an end surface of the part in which the second recessed portion 7b is formed, are formed in axially shifted positions, and thus, the first end surface 7c is closer to the motor 3 than the second end surface 7d. Further as illustrated in FIG. 1, a coupling portion 7e is formed on the release-mechanism-2 side of the first recessed portion 7a. One end of a release fork 29, which is part of the release mechanism 2, is rotatably coupled to the coupling portion 73.

As illustrated in FIG. 3, the ball screw shaft 21 and the ball screw nut 22 are partially inserted into the first recessed portion 7a. An end surface 22d of the ball screw nut 22 is contactable to the first end surface 7c on the first-recessed-portion-7a side. The trapezoidal screw shaft 26 is inserted into the second recessed portion 7b. An end surface 27a of the trapezoidal screw nut 27 is contactable to the end surface 7d on the second-recessed-portion-7b side.

Actions

Action in Switching from Clutch-On to Clutch-Off (Release)

In producing the clutch-off state (in blocking transmission of power), the release fork 29 of the release mechanism 2 is required to be rotated in an R1 direction in FIG. 1(a). In this case, the motor 3 is rotated in a first direction. The rotation of the motor 3 is transmitted to the ball screw shaft 21 of the ball screw mechanism 5 through the first gear 13. The rotation of the ball screw shaft 21 is transmitted to the ball screw nut 22 through the balls 23. Rotation of the ball screw nut 22 is prevented by the trapezoidal screw nut 27 disposed in the protruding portion 22b. Therefore, the rotation of the ball screw shaft 21 is converted into an A-directional axial movement of the ball screw nut 22 in FIG. 1(a). Accordingly, the end surface 22d of the ball screw nut 22 makes contact with the first end surface 7c of the output member 7, and the output member 7 is moved in the A direction. Therefore, the release fork 29 is rotated in the R1 direction in FIG. 1(a), and the clutch device is switched into the clutch-off state.

On the other hand, rotation of the first gear 13 is transmitted to the second gear 14. In FIG. 1(b), the first gear 13 is rotated in a clockwise direction, whereas the second gear 14 is rotated in a counterclockwise direction. Therefore, the phase switch pin 16 is similarly revolved. However, the phase switch plate 15 is not rotated in a freewheel angle range, i.e., an angle range from separation of the phase switch pin 16 from the first end surface 15d of the phase switch plate 15 to contact of the phase switch pin 16 to the second end surface 15e of the phase switch plate 15. In other words, the trapezoidal screw shaft 26 is not rotated. As described above, while in this freewheel angle range, the ball screw nut 22 is moved in the A direction and is contacted to the first end surface 7c of the output member 7. On the other hand, the trapezoidal screw shaft 26 is not rotated, and therefore, the trapezoidal screw nut 27 is not moved in the A direction.

As illustrated in FIG. 3, a predetermined clearance G1 is produced between the end surface 27a of the trapezoidal screw nut 27 and the second end surface 7d of the output member 7 by a phase difference between actuations of the respective screw mechanisms 5 and 6 as described above. This clearance G1 is maintained while the motor 3 is being rotated in the first direction. Therefore, power is not transmitted from the trapezoidal screw mechanism 6 to the output member 7.

Action in Stopping Motor

In the clutch-off state, driving of the motor 3 is stopped. In other words, supply of electric power to the motor 3 is stopped.

In the clutch-off state, as described above, elastic force F (see FIG. 1(a)) of the diaphragm spring composing a part of the clutch device herein acts on the output member 7 in a B direction in FIG. 1(a). In other words, a driving force oppositely directed from the aforementioned driving force acts on the output member 7.

The output member 7 is pressed in the B direction and the ball screw nut 22 is pressed in the same direction by the reverse driving force. Accordingly, the ball screw shaft 21 and the first gear 13 are rotated in a reverse direction from the aforementioned direction (note the first gear 13 is rotated in the counterclockwise direction). The phase switch pin 16 is thereby separated away from the second end surface 15e of the phase switch plate 15.

On the other hand, the output member 7 is moved in the B direction, and thereby, the second end surface 7d of the output member 7 is contacted to the end surface 27a of the trapezoidal screw nut 27. However, the trapezoidal screw nut 27 is not rotated due to the self-lock function of the trapezoidal screw mechanism 6. In other words, neither the trapezoidal screw shaft 26 nor the phase switch plate 15 fixed thereto is rotated. Therefore, the phase switch pin 16, separated away from the second end surface 15e of the phase switch plate 15, is stopped in a position between the second end surface 15e and the first end surface 15d.

Action in Switching from Clutch-Off to Clutch-On

In producing the clutch-on state, the release fork 29 of the release mechanism 2 is required to be rotated in an R2 direction in FIG. 1(a).

In this case, the motor 3 is rotated in a second direction. The first gear 13 is thereby rotated in the counterclockwise direction, whereas the second gear 14 is rotated in the clockwise direction.

As described above, where the self-lock function is herein actuated while the motor 3 is stopped, the phase switch pin 16 is located in a position between the second end surface 15e and the first end surface 15d of the phase switch plate 15.

Figure 4:
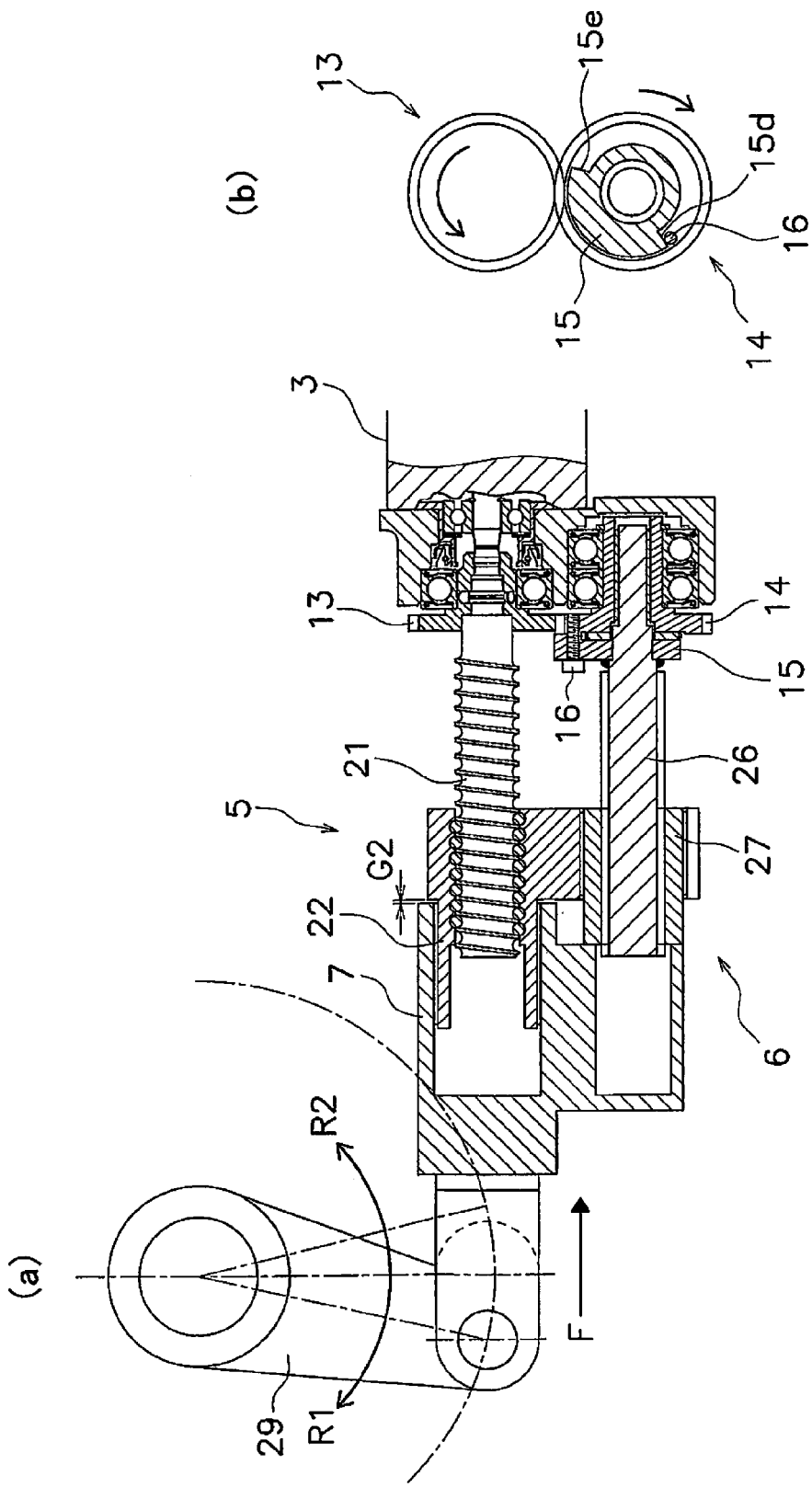
FIG. 4(a) is a diagram of the clutch actuator in transition from a clutch-off state to a clutch-on state.
FIG. 4(b) is a front view of the power transmission mechanism of FIG. 1(b) in which the phase switch pin is engaging a first end surface of a phase switch plate.

When the second gear 14 is rotated in the clockwise direction in the state as described above, the ball screw nut 22 is moved in the B direction in conjunction with rotation of the ball screw shaft 21, while the phase switch pin 16 is moving from its stopped position to the contact position with the first end surface 15d of the phase switch plate 15. On the other hand, the trapezoidal screw shaft mechanism 6 is not actuated. Therefore, as illustrated in FIG. 4, a clearance G2 is produced between the end surface 22d of the ball screw nut 22 and the first end surface 7c of the output member 7.

When the second gear 14 is then rotated in the clockwise direction and the phase switch pin 16 is contacted to the first end surface 15d of the phase switch plate 15, the phase switch pin 16 presses the first end surface 15d of the phase switch plate 15, and the phase switch plate 15 and the trapezoidal screw shaft 26 are thereby rotated in the same direction. Accordingly, the trapezoidal screw nut 27 is moved in the B direction, and the output member 7 is also moved in the B direction by the pressing force applied from the release mechanism 2. As a result, in the clutch device, the pressure plate is pressed toward the flywheel by the diaphragm spring, and this results in the clutch-on state in which the clutch is engaged.

Features

The ball screw mechanism 5 is used as a drive mechanism for producing the clutch-off state, and thereby, the driving force can be efficiently transmitted. Thus, a reduction in a size of the motor is enabled.

The self-lock function is implemented by the trapezoidal screw mechanism 6. Therefore, the mechanism for self-lock can be simply structured.

Rotation of the ball screw nut 22 can be prevented with the simple structure.

Second Exemplary Embodiment

Figure 5:
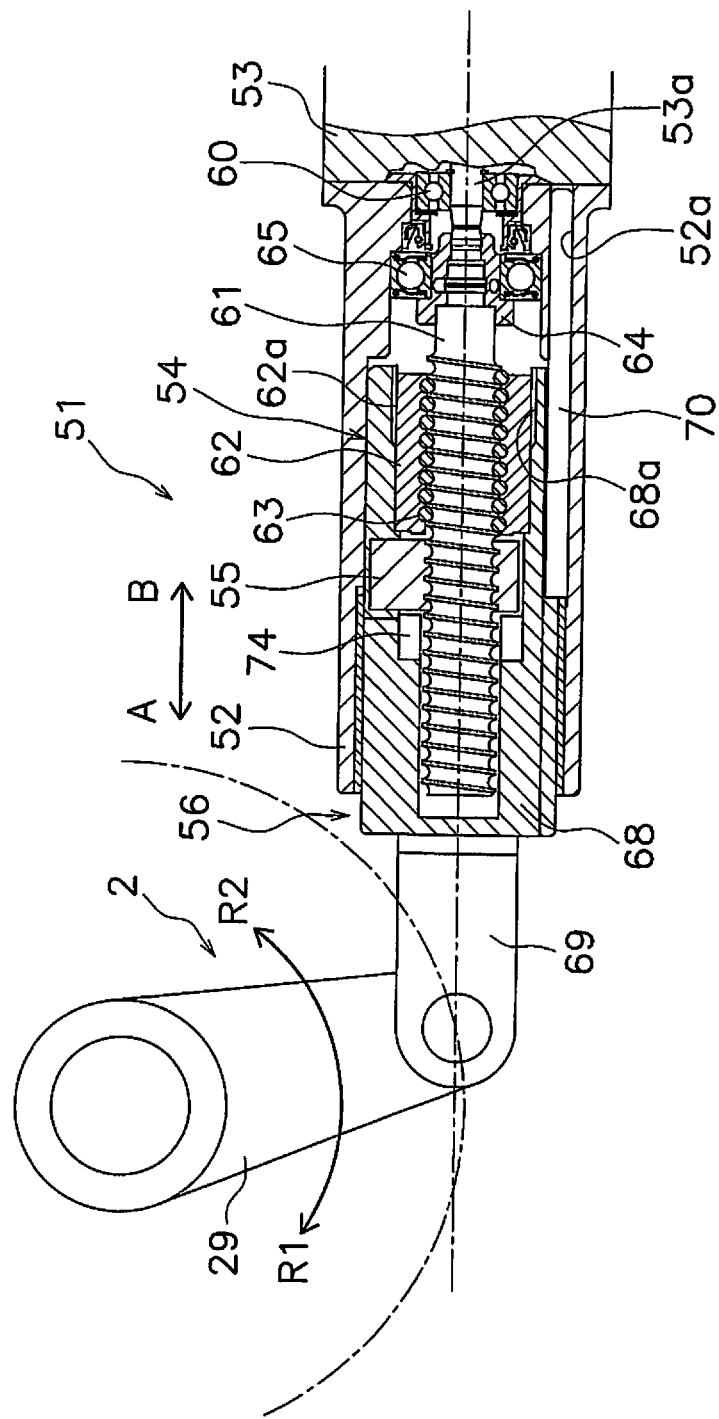
FIG. 5 is a diagram corresponding to FIG. 1 according to a second exemplary embodiment of the present invention.

FIG. 5 illustrates an actuator 51 according to a second exemplary embodiment. The actuator 51 includes a tubular case 52, an electric motor 53, a drive mechanism 54, a lock screw nut 55 and an output member 56.

The motor 53 is fixed to the lateral surface of one end part of the case 52. A rotation shaft 53a of the motor 53 is rotatably supported by the case 52 through a bearing 60.

Drive Mechanism

The drive mechanism 54 is accommodated inside of the case 52, and includes a ball screw shaft 61, a ball screw nut 62 and a plurality of balls 63.

The ball screw shaft 61 has a helical screw thread on the outer peripheral surface thereof. Further, one end of the ball screw shaft 61 is coupled to the rotation shaft 53a of the motor 53 through a joint 64. The joint 64 is rotatably supported by the case 52 through a bearing 65.

The ball screw nut 62 has a helical screw thread formed on the inner peripheral surface thereof, and the ball screw shaft 61 is inserted through the inside of the ball screw nut 62. Further, the ball screw nut 62 has a spline shaft 62a formed on one end part of the outer peripheral surface thereof.

The plurality of balls 63 are rollably disposed on the screw thread formed on the ball screw shaft 61 and formed on the ball screw nut 62.

Lock Screw Nut

The lock screw nut 55 is screwed onto the ball screw shaft 61 on the release-mechanism side of the ball screw nut 62. This lock screw nut 55 has a self-lock function with respect to the ball screw shaft 61. When power is applied from the lock-screw-nut-55 side, the lock screw nut 55 is self-locked without being rotated with respect to the ball screw shaft 61.

Figure 6:
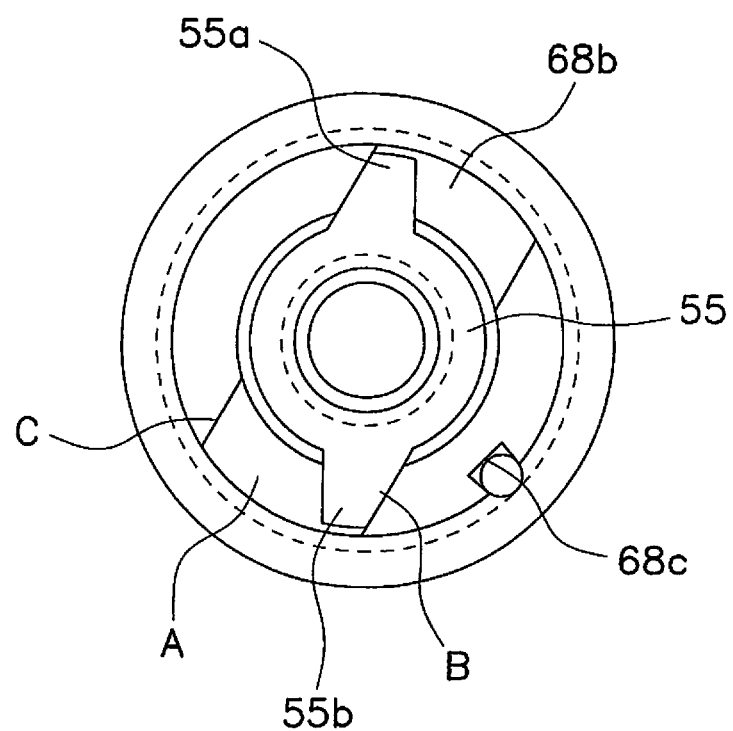
FIG. 6 is a diagram illustrating a relation between a lock screw nut and an output member in the second exemplary embodiment.

As illustrated in FIG. 6, a pair of anti-rotation portions 55a and 55b is formed on the outer peripheral surface of the lock screw nut 55 to protrude radially outwardly. It should be noted that FIG. 6 is a front view illustrating a relation between the lock screw nut 55 and the output member 56.

Output Member

The output member 56 is a member extending in a direction arranged along the axis of the ball screw shaft 61, and has a tubular portion 68 formed on the motor-53 side, and a coupling portion 69 formed on the release-mechanism-2 side of the tubular portion 68.

The tubular portion 68 accommodates the ball screw shaft 61, the ball screw nut 62 and the lock screw nut 55 inside thereof. A spline hole 68a is formed on the motor-53-side end part of the tubular portion 68, and the spline shaft 62a of the ball screw nut 62 is fitted to this spline hole 68a. Further, a slit 68b is formed in the motor-53-side part of the tubular portion 68 to radially penetrate therethrough. The pair of anti-rotation portions 55a and 55b of the lock screw nut 55 is inserted into this slit 68b to be rotatable in a predetermined angular range.

It should be noted that a groove 68c is formed on the outer peripheral surface of the tubular portion 68 along the axial direction, whereas a similar groove 52a is formed in a part of the case 52 to correspond to the groove 68c. A rod 70 is inserted into these grooves 68c and 52a. Accordingly, the output member 56 is supported by the case 52, while being axially movable with respect thereto and non-rotatable relative thereto.

Further, a collar 74 is disposed inside of the output member 56. The collar 74 is capable of making contact with or separating away from the lateral surface of the lock screw nut 55.

The release fork 29, which is part of the release mechanism 2, is rotatably coupled at one end thereof to the coupling portion 69.

Action

Action in Switching from Clutch-On to Clutch-Off (Release)

In producing the clutch-off state (in blocking transmission of power), the release fork 29 of the release mechanism 2 is required to be rotated in an R1 direction in FIG. 5. In this case, the motor 53 is rotated in the first direction. The rotation of the motor 53 is transmitted to the ball screw shaft 61 through the joint 64. The rotation of the ball screw shaft 61 is transmitted to the ball screw nut 62 through the plurality of balls 63. The output member 56 is coupled to the ball screw nut 62 by the spline coupling. Therefore, the rotation of the ball screw shaft 61 is converted into an A-directional axial movement of the ball screw nut 62 and the output member 56 in FIG. 5. Accordingly, the release fork 29 is rotated in the R1 direction in FIG. 5, and the clutch device is switched into the clutch-off state.

In the aforementioned state, the anti-rotation portion 55b of the lock screw nut 55 is contacted to an end surface B (see FIG. 6) of the slit 68b. In this case, a clearance is produced between the lock screw nut 55 and the collar 74.

Action in Stopping Motor

In the clutch-off state, driving of the motor 53 is stopped. In other words, supply of electric power to the motor 53 is stopped.

In the clutch-off state, similarly to the aforementioned exemplary embodiment, the elastic force of the diaphragm spring composing a part of the clutch device herein acts on the output member 56 in a B direction in FIG. 5. The output member 56 and the ball screw nut 62 are thereby moved in the B direction. Accordingly, the collar 74 is contacted to the end surface of the lock screw nut 55; the anti-rotation portion 55b of the lock screw nut 55 is moved to an A position in FIG. 6; and thus, power is transmitted to the lock screw nut 55.

In such state, i.e., when reverse driving force is applied to the ball screw shaft 61 from the lock screw nut 55, rotation of the lock screw nut 55 is stopped by the self-lock function. Therefore, the B-directional movement of the output member 56 is stopped.

Action in Switching from Clutch-Off to Clutch-On

In producing the clutch-on state, the release fork 29 of the release mechanism 2 is required to be rotated in an R2 direction in FIG. 5. In this case, the motor 53 is rotated in the second direction. The ball screw shaft 61 is thereby rotated reversely from the aforementioned direction, and the rotation thereof is converted into the B-directional movement of the ball screw nut 62 and the output member 56. As a result, in the clutch device, the pressure plate is pressed toward the flywheel by the diaphragm spring, and this results in the clutch-on state in which the clutch is engaged.

In the aforementioned state, the anti-rotation portion 55b of the lock screw nut 55 is contacted to an end surface C (see FIG. 6) of the slit 68b. In this case, a clearance is produced between the lock screw nut 55 and the collar 74.

Other Exemplary Embodiments

The present invention is not limited to the aforementioned exemplary embodiments, and a variety of changes or modifications can be made without departing from the scope of the present invention.

In the aforementioned exemplary embodiments, the ball screw mechanism has been employed as the first drive mechanism or the drive mechanism. However, the present invention is not limited to such configuration. For example, a planetary roller screw mechanism may be similarly employed.

Further, the mechanism for self-lock is not limited to the trapezoidal screw mechanism. Alternatively, a screw mechanism having another shape may be similarly employed.

According to the clutch actuator of the exemplary embodiments of the present invention, it is possible to enhance efficiency of a clutch actuator for actuating a release mechanism in driving the release mechanism.

The invention claimed is:

1. A clutch actuator for driving a release mechanism of a clutch, comprising:
   an electric motor;
   an output member coupled to the release mechanism, the output member being movable in an actuation direction of the release mechanism;
   a first drive mechanism configured to convert rotation of the electric motor in a first direction into movement of the output member in a first axial direction; and
   a second drive mechanism having a self-lock function against a reverse driving force from the release mechanism, the second drive mechanism being configured to convert rotation of the electric motor in a second direction into movement of the output member in a second axial direction, wherein the first drive mechanism includes
   a first screw shaft having a first screw thread on an outer peripheral surface thereof, the first screw shaft being coupled to an output shaft of the electric motor;
   a first nut having a second screw thread on an inner peripheral surface thereof, the first nut being configured to contact the output member to move the output member in the first axial direction when the electric motor is rotated in the first direction while being configured to be moved away from the output member when the electric motor is rotated in the second direction; and
   a plurality of balls being disposed on the first and second screw threads.

2. The clutch actuator recited in claim 1, wherein the first drive mechanism is a ball screw mechanism configured to press the output member in the first axial direction by rotation of the electric motor in the first direction.

3. The clutch actuator recited in claim 1, wherein the second drive mechanism is a trapezoidal screw mechanism to which the reverse driving force from the output member is transmitted and that is configured to move the output member in the second axial direction by means of the rotation of the electric motor in the second direction.

4. The clutch actuator recited in claim 3, wherein the trapezoidal screw mechanism includes
- a second screw shaft configured to be rotated by rotation of the electric motor in the second direction; and
- a second nut screwed onto the second screw shaft, the second nut being configured to be self-locked with the second screw shaft when receiving the reverse driving force from the output member while being configured to be moved together with the output member in the second axial direction when receiving a driving force from the second screw shaft.

5. The clutch actuator recited in claim 4, wherein the first screw shaft and the second screw shaft are disposed in parallel to each other, the first nut has a protruding portion protruding toward the second screw shaft, and the second nut is disposed in the protruding portion of the first nut to be axially slidable.

\* \* \* \* \*